(12) United States Patent
Goguen

(10) Patent No.: US 7,376,706 B2
(45) Date of Patent: May 20, 2008

(54) EMAIL MESSAGE FILTERING SYSTEM AND METHOD

(75) Inventor: Tristan Goguen, Toronto (CA)

(73) Assignee: Internet Light and Power Inc., Toronto, ON (CA)

(*) Notice: Subject to any disclaimer, the term of this patent is extended or adjusted under 35 U.S.C. 154(b) by 442 days.

(21) Appl. No.: 10/761,308

(22) Filed: Jan. 22, 2004

(65) Prior Publication Data

US 2004/0172429 A1 Sep. 2, 2004

(30) Foreign Application Priority Data

Feb. 28, 2003 (CA) .................................. 2420391

(51) Int. Cl.
*H04L 9/00* (2006.01)
(52) U.S. Cl. ..................... 709/206; 709/229; 707/206
(58) Field of Classification Search ..................... None
See application file for complete search history.

(56) References Cited

U.S. PATENT DOCUMENTS

2003/0236847 A1* 12/2003 Benowitz et al. ........... 709/206

OTHER PUBLICATIONS

"Mailblocks next generation email" by Dale Farris. http://gtpcc.org/gtpcc/mailblocks.htm. Apr. 2003.*

* cited by examiner

*Primary Examiner*—Charles Rones
*Assistant Examiner*—Belix M Ortiz
(74) *Attorney, Agent, or Firm*—Dimock Stratton LLP

(57) ABSTRACT

A system for eliminating unauthorized email messages ("spam email") blocks all email messages except those that successfully pass through a matching process to verify certain characteristics of the email message, which may include the recipient's email address, the sender's email address, and the sender message handler Internet Protocol (IP) address. The invention provides a mechanism for authorizing a sender by "Adaptive Inheritance," whereby a recipient can designate other email users to authorize senders on behalf of the recipient. In the preferred embodiment if the sender message handler Internet Protocol (IP) address does not match the sender's email address, the sender's message is automatically rejected. If the sender's email address or domain name is not contained within the recipient's PSD, the message is held and the message sender is given directions for requesting permission to send email to the recipient, with a Permission Request Form (PRF) posted at a web site. The completed PRF is made available to the recipient for review, and the recipient must add the sender to the PSD before any message from that sender can be forwarded to the recipient.

20 Claims, 2 Drawing Sheets

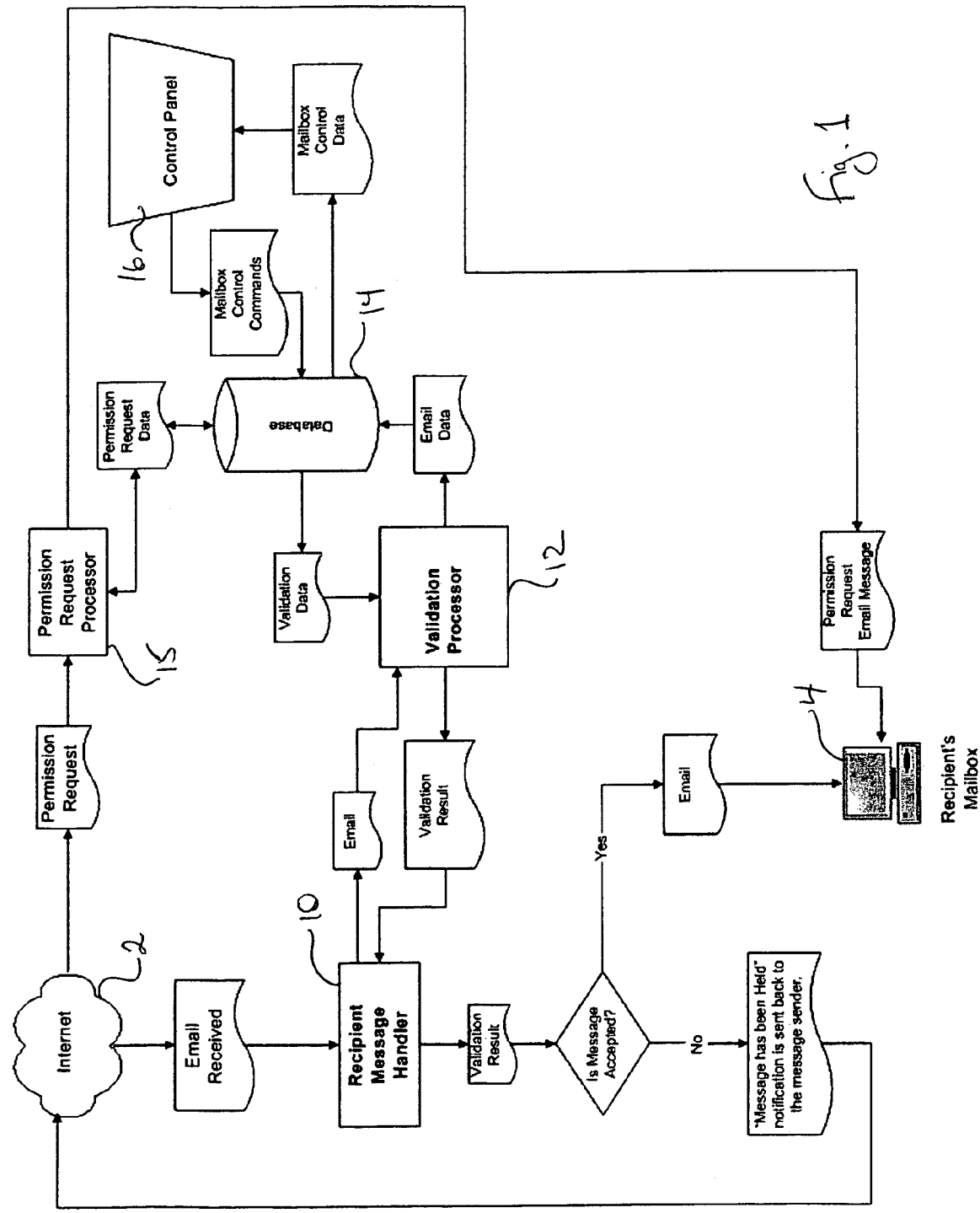

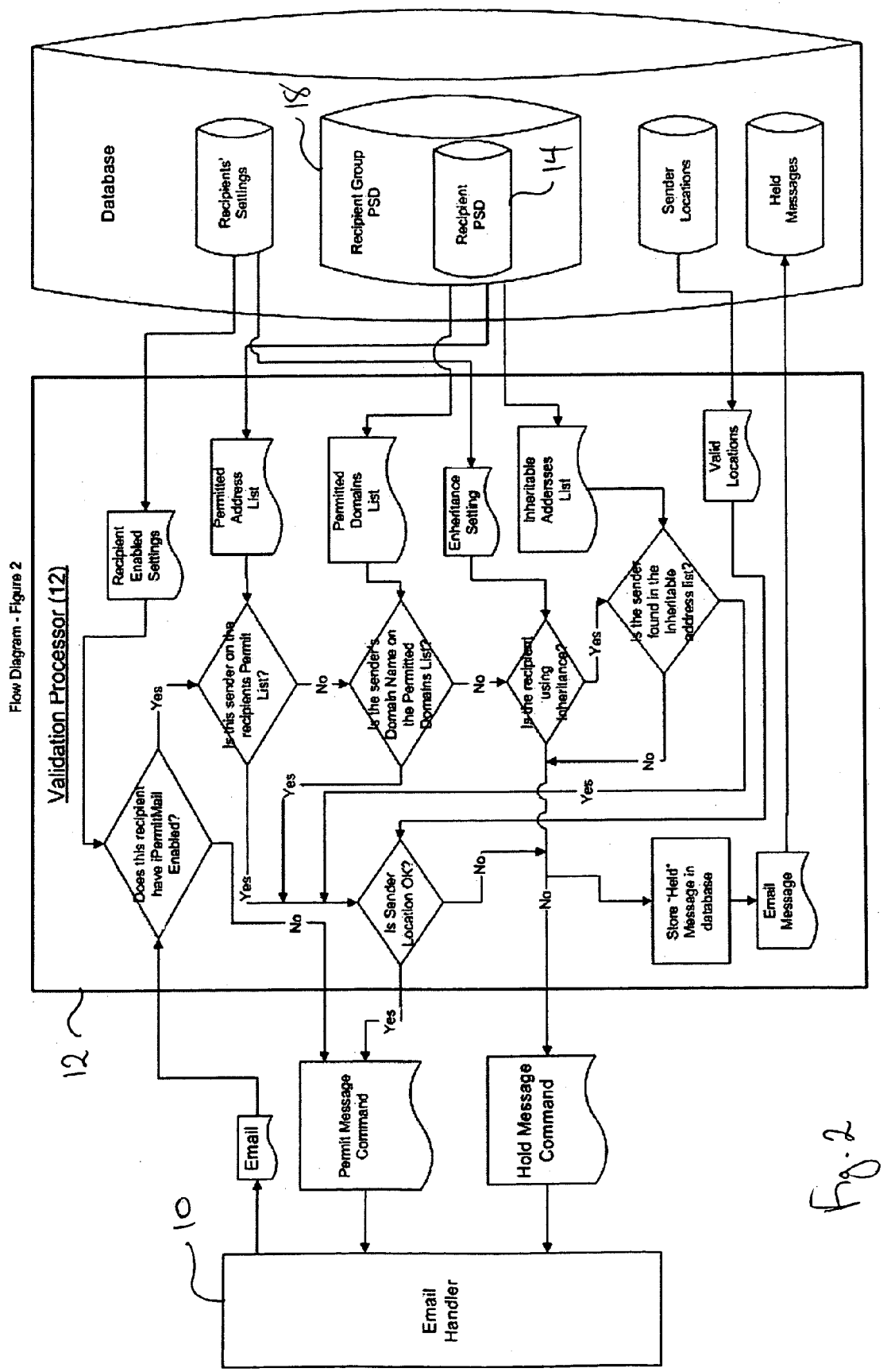

EMAIL MESSAGE FILTERING SYSTEM AND METHOD

FIELD OF THE INVENTION

This invention relates to email messaging systems. In particular, this invention relates to an email message filtering system and method that blocks unwanted email messages.

BACKGROUND OF THE INVENTION

Email messaging has become one of the most popular communications tools in industrialized society. The proliferation of personal computers for domestic and business use, coupled with the widespread use of the Internet as a global communications network, have resulted in email messaging being one of the most convenient forms of communication, in many instances more convenient than the telephone. Email messaging allows for the transmission of the written word in a form that is private and virtually instantaneous, and with the ability to attach documents is essentially unlimited in terms of the possible content and format of the message.

Email messaging also allows for the simultaneous transmission of messages to multiple senders. For this feature alone email messaging has become a very desirable marketing medium. All that is required is a mailing list or "group" of email addresses, and the same promotional message can simultaneously be sent to a virtually unlimited number of recipients. Where a recipient has not previously indicated any interest in receiving messages from the sender, this practice is known as "spamming", or Unsolicited Commercial E-mail (UCE.) Most Internet Service Providers (ISPs) prohibit spamming, which is considered undesirable and, to many recipients, irritating and wasteful of their time. Because spamming has become so popular, with the large number of purely promotional email messages received by many recipients (especially business recipients) it can be very time consuming for a recipient to regularly sort through their email messages to separate those that are wanted or necessary from those that are merely promotional and should be discarded.

Various types of solutions have been proposed and implemented to try to reduce spamming. Software is available that conceals an Internet user's email address, so that the owners of web sites visited by the user cannot determine the visitor's email address and therefore cannot add the user to a mailing list. This solution has limited utility, however, because as soon as the email address has been willingly provided by the user to a third party (for example with a request for information, goods or services), it can very quickly be disseminated for inclusion in email address lists maintained many other entities. As in the case of postal addresses, this type of demographic information is highly marketable. Moreover, an email address can often be fairly easily determined by other means, particularly in the case of a business where having a visible presence and being readily accessible is important to the success of the email user's business.

Email messaging programs often provide filters which allow a user to block or redirect received messages having, or missing, certain user-defined characteristics. However, this solution also has limited utility, because the recipient either has to have already received a message from the sender in order to block further messages from that sender (and there are also ways that a sender can hide or fake their identity to defeat such a blocking filter); or the recipient risks blocking messages that are actually useful or desirable, thereby generating "false positives." In the case of a business in particular, it is often not practical for the recipient to ignore email messages just because they originate from unknown senders, as these can be a source of new business or an unknown party related to an existing business transaction or situation.

However, in many instances it is also not practical for a recipient to qualify or verify every email sender that tries to send the recipient a message, as this can become even more time consuming than the existing practice of vetting and discarding unwanted email messages.

SUMMARY OF THE INVENTION

The present invention provides a system for eliminating unauthorized email messages (sometimes referred to herein as "spam email") sent to a recipient. The system of the invention blocks all email messages except for those email messages that successfully undergo a matching process to verify certain characteristics of the email message. Those characteristics may include the recipient email address, the sender email address, and/or the sender message handler (SMH) Internet Protocol (IP) address.

According to the invention, in order to minimize the time consuming chore of authorizing every new sender whose email messages are considered wanted or acceptable, the invention provides a mechanism for acceptance by "adaptive inheritance," whereby a recipient, by associating themselves with a "recipient group", can designate members of the recipient's recipient group, either local or remote, to authorize senders on the recipient's behalf, so that senders who have been authorized by other members of the recipient's recipient group user are automatically authorized to send mail to the recipient.

In the preferred embodiment each email message is received via any email transfer protocol, for example Simple Mail Transfer Protocol (SMTP), and analyzed to verify that the message sender email address or a domain name is contained within a recipient Permitted Sender Database (PSD). If the sender's email address is contained within the PSD, preferably the sender message handler Internet Protocol (IP) address is then matched with the message handler internet protocol (IP) address previously associated with that sender, to verify the authenticity of the sender's email address and reduce the possibility of fraudulent messages being sent without proper authorization (known as "identity spoofing"). If the sender message handler Internet Protocol (IP) address does not match the corresponding validation data in the recipient (PSD), the sender's message is automatically held by the message validation processor. If the sender message handler Internet Protocol (IP) address does match the sender email address and the sender email address or sender domain name is contained within the recipient PSD or that of another user who has been designated for "inheritance" purposes, described below, the sender's message is automatically accepted and sent through (or made accessible) to the recipient.

If the sender email address or domain name is not contained within the recipient PSD or, where the recipient has enabled Adaptive Inheritance, is not contained within the recipient group PSD, the message is held for a predetermined time interval, for example three days, and the message sender is sent a notification that their message has been held with directions for requesting permission to send email to the recipient. This message preferably contains a link to an online Permission Request Form (PRF) that allows the message sender to request permission to be added to the recipient PSD. A message containing the completed PRF is sent to the recipient for review. The recipient must then add the sender ("permit") to the PSD before any message from that sender will be forwarded to the recipient. Once the message sender has been added to the PSD, all subsequent messages sent by that sender to the recipient are permitted and are automatically forwarded to the recipient. The recipient may cause the messages of specific message senders by removing a message sender from the recipient PSD Alternatively, the recipient can receive messages from a sender who is not in the recipient PSD by enabling the "Adaptive Inheritance" feature. If the adaptive inheritance feature has been enabled, the sender's message will be forwarded to the recipient if another recipient, in good standing, belonging to the same recipient group has previously permitted the sender by adding the message sender to their own recipient PSD. When the Adaptive Inheritance feature is enabled, the message validation processor analyzes the entire recipient group PSD, to determine if another group recipient has authorized the message sender. If at least one group recipient, in good standing, has authorized the message sender by adding the message sender validation data to their recipient PSD, the sender is be "authorized by adaptive inheritance" and the message is forwarded to the recipient.

All options such as adaptive inheritance designations, location matching, message storage, information required by the PRF and so on are configured through each recipient group member's web-based control panel.

The present invention thus provides a system for blocking email messages sent over a communications network to a recipient, comprising a recipient message handler for receiving email messages from senders, at least one recipient permitted sender database (PSD) for storing sender information associated with senders authorized by the recipient, at least one recipient group Permitted Sender Database (PSD) for storing sender information associated with all members of a recipient group of which the recipient is a member, and a validation processor for comparing sender information in an email message received from a sender with corresponding sender information stored in the recipient PSD and the recipient group PSD, whereby when sender information in an email message sent by a sender matches corresponding sender information stored in the recipient PSD or the recipient group PSD the email message is forwarded or made accessible to the recipient, otherwise the email message is not forwarded or made accessible to the recipient.

In further aspects of the system of the invention: when the sender information in an email message sent by a sender does not match corresponding sender information stored in the recipient PSD but does match sender information stored in the recipient group PSD, the sender information is added to the recipient PSD; the sender information comprises a sender email address; when the sender's message handler internet protocol (IP) address does not match the message handler internet protocol (IP) address previously associated with that sender, the sender's message is held; when sender information in an email message sent by a sender does not match corresponding information stored in the recipient PSD or the recipient group PSD the email message is held for a preset hold interval and a message is sent to the sender with directions for completing a permission request form for submission to the recipient; where the recipient does not add the sender to the recipient PSD before the preset hold interval expires, after the preset hold interval the sender's email message is automatically deleted; where the recipient does not add the sender to the permitted sender database the sender's email message is deleted; when the recipient adds a sender to the recipient PSD an email message is automatically sent to the sender notifying the sender of the addition of the sender to the recipient PSD; and an email message is automatically sent to the sender notifying the sender of the refusal to add the sender to the permitted sender database.

The present invention further provides a method of blocking email messages sent over a communications network to a recipient, comprising the steps of: a. storing in a recipient PSD sender information associated with senders authorized by the recipient, b. storing in an recipient group PSD sender information associated with senders authorized by at least one other recipient group member in a recipient group of which the recipient is a member, c. receiving an email message from a sender, d. comparing sender information in the email message received from the sender with corresponding sender information stored in the recipient PSD and the recipient group PSD, and e. forwarding the email message to the recipient only if the sender information in the email message matches the corresponding sender information stored in the recipient PSD or the recipient class PSD.

In further aspects of the method of the invention: when the sender information in an email message sent by a sender does not match corresponding sender information stored in the recipient PSD but does match sender information stored in the recipient group PSD, the step of adding the sender information to the recipient PSD; in step d. the sender information comprises a sender email address; in step d. the sender information comprises a sender message handler Internet Protocol (IP) address; if the sender's message handler internet protocol (IP) address does not match the message handler internet protocol (IP) address previously associated with that sender, the sender's message is held; the method includes after step d., when sender information in an email message sent by a sender does not match corresponding information stored in the recipient PSD or the recipient class PSD, the steps of holding the email message for a preset hold interval and sending a message to the sender with directions for completing a permission request form for submission to the recipient; the method includes where the recipient fails to add the sender to the recipient PSD before the preset hold interval expires, the step of deleting the sender's email message automatically after the preset hold interval; the method includes where the recipient does not add the sender to the recipient PSD, the step of deleting the sender's email message; the method includes when the recipient adds a sender to the recipient PSD, the step of forwarding an email message to the sender notifying the sender of the addition of the sender to the recipient PSD; and the method includes the step of notifying the sender that the recipient did not add the sender to the permitted sender database.

BRIEF DESCRIPTION OF THE DRAWINGS

In drawings which illustrate by way of example only a preferred embodiment of the invention, FIG. 1 is a schematic diagram illustrating an email filtering system according to the invention, and FIG. 2 is a flow diagram illustrating the method of filtering email messages according to the invention.

DETAILED DESCRIPTION OF THE INVENTION

FIG. 1 illustrates a preferred embodiment of an email filtering system according to the invention. An email message sent over a communications network, for example the Internet 2, is received by the recipient message handler 10, for example a conventional email exchange server. The recipient message handler 10 filters the email message through a message validation processor 12, which compares selected validation data from the email message (for example one or more of the recipient's email address, the sender's email address, and the sender message handler Internet Protocol (IP) address) with corresponding validation data stored in the recipient PSD 14. The validation data has been entered into the Permitted Sender Database (PSD) 14 from previously received and accepted Permission Request Forms (PRFs) completed and submitted by senders who request permission to send email messages to the recipient. As shown in FIG. 2, the recipient Permitted Sender Database (PSD) 14 preferably also stores data relating to the recipient's personal settings, held messages, and an address list of senders permitted by "adaptive inheritance" which is described in greater detail below. However, any number of databases can be used to store this information, and for purposes of the present invention the number of databases which are used to store the information is not relevant and merely a matter of choice by the system programmer.

Optionally, if the sender's mail handler internet protocol (IP) address does not match the mail handler internet protocol (IP) address previously associated with that sender, the sender's message is held. If the sender's mail handler internet protocol (IP) address matches the mail handler internet protocol (IP) address previously associated with that sender, then as long as the validation data in the sender's email message corresponds with validation data previously stored in the recipient PSD 14, the email message is forwarded to the recipient.

If the validation data in the sender's email message does not correspond with validation data previously stored in the recipient PSD 14, the message is held by the message validation processor 12 for a selected time interval, for example three days or any other desired interval, and the message sender is automatically sent an email massage by the message validation processor 12, notifying the sender that the message is been held and providing to the sender directions for requesting permission to send email to the recipient. The directions instruct the sender to link to a Permission Request Form (PRF) resident on a web site. By completing the information required by the PRF, and sending the PRF to the recipient, the message sender requests permission to be added to the recipient PSD. The PRF includes fields for the sender to input any information required by the recipient for authorizing senders, and may optionally prevent the sender from sending the form until all fields have been properly completed.

The completed PRF is forwarded by the Permission Request Processor 15 to the recipient. If the recipient does nothing, then after the selected hold interval the sender's email message is automatically deleted and, optionally, a message is automatically sent to the sender notifying the sender that permission to send email messages to the recipient has been refused. Alternately, the recipient may add the sender to the recipient PSD by clicking an web-based link in the forwarded PRF that invokes a web site that automatically adds the sender to the recipient PSD, in which case the sender's email message and any further messages containing the accepted validation data will be forwarded to the recipient and optionally a message may automatically be sent to the sender notifying the sender that permission to send email messages to the recipient has been accepted.

Preferably a sender may also be authorized by adding the sender to the recipient PSD 14 through the control panel 16 manually, without requiring a PRF. Once the message sender has been added to the PSD 14, all subsequent messages sent to the recipient by that sender (as determined by the inclusion of matching validation data) are permitted and are automatically forwarded to the recipient.

To reduce the number of PRFs that must be reviewed by the recipient in order to authorize the receipt of email messages from various senders, the control panel 16 provides an option to enable a feature referred to herein as "Adaptive Inheritance." Using the Adaptive Inheritance feature the recipient can designate other group recipients, who may be physically either remote recipients or local recipients (for example distributed either on a wide area network (WAN) such as the Internet or a local area network (LAN)), to authorize senders on the recipient's behalf. Once Adaptive Inheritance has been enabled and the recipient has designated at least one other recipient as a member of the recipient group, the recipient will receive messages from a sender who has not been authorized directly by the recipient as long as the sender has been authorized by one or more members, in good standing, of the recipient group.

Thus, as illustrated in FIG. 2, if the Adaptive Inheritance feature has been enabled the sender's message will be forwarded to the recipient as long as at least one member of the recipient's group has added the message sender validation data to their recipient PSD 14. Enabling the Adaptive Inheritance feature causes the message validation processor 12 to analyze the entire recipient group PSD 18, which includes the recipient PSD 14 and the PSDs of all other recipient group members. If another recipient group member has previously authorized the message sender by adding the message sender to their own recipient PSD, the message will be "authorized by inheritance" and forwarded (or made accessible) to the recipient.

In the preferred embodiment, once the sender validation data is located in another recipient group member's recipient PSD it is added to the recipient's PSD 14, so that if at a later date the recipient group member is removed from the recipient group, or Adaptive Inheritance is disabled by the recipient, the sender remains authorized by the recipient and does not have to be re-authorized in order to send mail to the recipient.

A recipient becomes a member of a recipient group by requesting to be added to a specific recipient group. Recipient group management either rejects or accepts the request for group membership. A recipient may inherit the PSD entries from other recipient group members at any time. However, only a recipient "in good standing" in the recipient group may cause other group members to inherit permitted senders from a recipient PSD 14.

In the preferred embodiment, recipients become the source of inheritance after a preset time interval. Once a recipient becomes an inheritance source, they accumulate a preset number of inheritance credits for every n messages that the recipient causes, through Adaptive Inheritance, to be forwarded to other recipient group members, that are accepted by those same recipient group members. Once a recipient becomes an inheritance source, they accumulate a present number of inheritance debits for every n messages that the recipient causes, through Adaptive Inheritance, to be forwarded to other recipient group members, that are rejected by those same recipient group members.

Once the number of rejected inheritances reaches a preset ratio to total inheritances for a given recipient, the recipient irrevocably can no longer be the source of inheritance for other recipient group members, and the recipient loses the status as a member in good standing.

Once the number of rejected inheritances reaches a preset absolute number for a given recipient, the recipient irrevocably can no longer be the source of inheritance for other recipient group members; the recipient loses the status as a member in good standing.

The information in the recipient PSD 14 may be stored in any desired format. For example, in the preferred embodiment where a three-way match (consisting of the recipient email address a@b.c, the sender email address d@e.f, and the sender message handler Internet Protocol (IP) address 1.2.3.4.) is required before a sender's message will be forwarded to (or made accessible to) forwarded to the recipient, the data may be stored and/or presented as "a@b.c:d@e.f:1.2.3.4."

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed:

1. A system for selectively blocking email messages sent by a sender over a communications network to a recipient without requiring prior communication between the sender and the recipient, comprising:
   a recipient message handler for receiving email messages from senders,
   at least one recipient permitted sender database (PSD) for storing sender information associated with senders authorized by the recipient,
   at least one recipient group Permitted Sender Database (PSD) for storing sender information associated with senders authorized by at least one members of a recipient group of which the recipient is a member, and
   whereby the decision to forward the email message is determined by the sender having been authorized by either the recipient or the at least one member of the recipient group of which the recipient is a member.

2. The system of claim 1 wherein when the sender information in an email message sent by a sender does not match corresponding sender information stored in the recipient PSD but does match sender information stored in the recipient group PSD, the sender information is added to the recipient PSD.

3. The system of claim 1 wherein the sender information comprises a sender email address.

4. The system of claim 3 wherein the sender information comprises a sender message handler Internet Protocol (IP) address.

5. The system of claim 4 wherein when the sender's message handler internet protocol (IP) address does not match the message handler internet protocol (IP) address previously associated with that sender, the sender's message is held.

6. The system of claim 1 wherein when sender information in an email message sent by a sender does not match corresponding information stored in the recipient PSD or the recipient group PSD the email message is held for a preset hold interval and a message is sent to the sender with directions for completing a permission request form for submission to the recipient.

7. The system of claim 6 wherein where the recipient does not add the sender to the recipient PSD before the preset hold interval expires, after the preset bold interval the sender's email message is automatically deleted.

8. The system of claim 6 wherein where the recipient does not add the sender to the permitted sender database the sender's email message is deleted.

9. The system of claim 7 wherein when the recipient adds a sender to the recipient PSD an email message is automatically sent to the sender notifying the sender of the addition of the sender to the recipient PSD.

10. The system of claim 8 wherein an email message is automatically sent to the sender notifying the sender of the refusal to add the sender to the permitted sender database.

11. A method of selectively blocking email messages sent by a sender over a communications network to a recipient without requiring prior communication between the sender and the recipient comprising the steps of:
   a. storing in a recipient PSD sender information associated with senders authorized by the recipient,
   b. storing in a recipient group PSD sender information associated with senders authorized by at least one other recipient group member in a recipient group of which the recipient is a member,
   c. receiving an email message from the sender,
   d. comparing sender information in the email message received from the sender with corresponding sender information stored in the recipient PSD to determine if the sender has been authorized by the recipient, and if the sender has not been authorized by the recipient, comparing sender information in the email message received from the sender with corresponding sender information stored in the recipient group PSD to determine if the recipient group has authorized the sender, and
   e. if the sender has been authorized by the recipient or the recipient group, forwarding the email message to the recipient, or
      if the sender has not been authorized by either the recipient or the recipient group, not forwarding the email message.

12. The method of claim 11 including, when the sender information in an email message sent by a sender does not match corresponding sender information stored in the recipient PSD but does match sender information stored in the recipient group PSD, the step of adding the sender information to the recipient PSD.

13. The method of claim 11 wherein in step d the sender information comprises a sender email address.

14. The method of claim 13 wherein in step d sender information comprises a sender message handler Internet Protocol (IP) address.

15. The method of claim 14 wherein if the sender's message handler internet protocol (IP) address does not match the message handler internet protocol (IP) address previously associated with that sender, the sender's message is held.

16. The method of claim 11 including after step d when sender information in an email message sent by a sender does not match corresponding information stored in the recipient PSD or the recipient group PSD the email message is held for a preset hold interval and a message is sent to the sender with directions for completing a permission request form for submission to the recipient.

17. The method of claim 16 including, where the recipient fails to add the sender to the recipient PSD before the preset hold interval expires, the step of deleting the sender's email message automatically after the preset hold interval.

18. The method of claim 16 including, where the recipient does not add the sender to the recipient PSD, the step of deleting the sender's email message.

19. The method of claim 17 including, when the recipient adds a sender to the recipient PSD, the step of forwarding an email message to the sender notifying the sender of the addition of the sender to the recipient PSD.

20. The method of claim 18 including the step of notifying the sender that the recipient did not add the sender to the permitted sender database.

* * * * *